(12) United States Patent
Nakayama (10) Patent No.: US 11,302,954 B2
(45) Date of Patent: *Apr. 12, 2022

(54) NONAQUEOUS ELECTROLYTE SECONDARY BATTERY

(71) Applicant: TOYOTA JIDOSHA KABUSHIKI KAISHA, Toyota (JP)

(72) Inventor: Tetsuri Nakayama, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/113,093

(22) Filed: Aug. 27, 2018

(65) Prior Publication Data
US 2019/0081349 A1 Mar. 14, 2019

(30) Foreign Application Priority Data
Sep. 11, 2017 (JP) .............................. JP2017-174334

(51) Int. Cl.
*H01M 10/0525* (2010.01)
*H01M 4/525* (2010.01)
(Continued)

(52) U.S. Cl.
CPC ....... *H01M 10/0525* (2013.01); *H01M 4/131* (2013.01); *H01M 4/505* (2013.01);
(Continued)

(58) Field of Classification Search
CPC combination set(s) only.
See application file for complete search history.

(56) References Cited

U.S. PATENT DOCUMENTS

2012/0308881 A1  12/2012  Tokuda et al.
2013/0337305 A1  12/2013  Nagai et al.
(Continued)

FOREIGN PATENT DOCUMENTS

CN  103403942 A  11/2013
CN  104781976 A  7/2015
(Continued)

OTHER PUBLICATIONS

Robert S. Marvin, "The Accuracy of Measurements of Viscosity of Liquids", Journal Research of the National Bureau of Standards—A. Physics and Chemistry, Nov.-Dec. 1971, pp. 535-540, vol. 75A, No. 6 (6 pages total).
(Continued)

*Primary Examiner* — Ula C Ruddock
*Assistant Examiner* — Sarika Gupta
(74) *Attorney, Agent, or Firm* — Sughrue Mion, PLLC (57) ABSTRACT

Provided is a nonaqueous electrolyte secondary battery with excellent low-temperature performance. The nonaqueous electrolyte secondary battery disclosed herein includes a positive electrode, a negative electrode, a separator interposed between the positive electrode and the negative electrode, and a nonaqueous electrolytic solution. The positive electrode includes a positive electrode active material layer. The positive electrode active material layer includes, as a positive electrode active material, a lithium transition metal composite oxide including at least lithium, nickel, manganese, cobalt, and tungsten. The nonaqueous electrolytic solution includes lithium fluorosulfonate and $LiPF_6$. The concentration of $LiPF_6$ in the nonaqueous electrolytic solution is 1.11 mol/L or more. The viscosity of the nonaqueous electrolytic solution at 25° C. is 3.1 cP or more. The separator includes a resin layer and an inorganic layer formed on a surface of the resin layer that faces the positive
(Continued)

electrode. Where a porosity of the inorganic layer is denoted by α, a porosity of the resin layer is denoted by β, and a porosity of the positive electrode active material layer is denoted by γ, relationships of $0.6 \leq (\beta/\alpha) \leq 0.9$ and $0.6 \leq (\gamma/\alpha) \leq 0.9$ are fulfilled.

2 Claims, 3 Drawing Sheets

(51) Int. Cl.
*H01M 4/131* (2010.01)
*H01M 10/0567* (2010.01)
*H01M 10/052* (2010.01)
*H01M 50/411* (2021.01)
*H01M 50/431* (2021.01)
*H01M 50/449* (2021.01)
*H01M 4/505* (2010.01)
*H01M 10/0568* (2010.01)
*H01M 4/02* (2006.01)

(52) U.S. Cl.
CPC ......... *H01M 4/525* (2013.01); *H01M 10/052* (2013.01); *H01M 10/0567* (2013.01); *H01M 10/0568* (2013.01); *H01M 50/411* (2021.01); *H01M 50/431* (2021.01); *H01M 50/449* (2021.01); *H01M 2004/021* (2013.01); *H01M 2004/028* (2013.01); *H01M 2300/0025* (2013.01)

(56) References Cited

U.S. PATENT DOCUMENTS

| | | | |
|---|---|---|---|
| 2014/0017573 A1* | 1/2014 | Otsuki | ................ H01M 10/052 429/330 |
| 2014/0255783 A1 | 9/2014 | Takahata et al. | |
| 2014/0272604 A1 | 9/2014 | Lim et al. | |
| 2015/0188183 A1 | 7/2015 | Nagai et al. | |
| 2016/0226106 A1 | 8/2016 | Minami et al. | |
| 2017/0077550 A1 | 3/2017 | Nishie et al. | |
| 2017/0092979 A1 | 3/2017 | Chiga et al. | |

FOREIGN PATENT DOCUMENTS

| | | | |
|---|---|---|---|
| CN | 105845979 A | | 8/2016 |
| JP | 2011187440 A | | 9/2011 |
| JP | 2012195224 A | * | 10/2012 |
| JP | 2012195224 A | | 10/2012 |
| JP | 2014011070 A | | 1/2014 |
| JP | 2015-037012 A | | 2/2015 |
| JP | 2015037012 A | * | 2/2015 |
| JP | 5709010 B2 | | 4/2015 |
| JP | 2016-143454 A | | 8/2016 |
| KR | 10-2014-0083029 A | | 7/2014 |
| WO | 2011/108119 A1 | | 9/2011 |

OTHER PUBLICATIONS

Notice of Allowance dated Apr. 7, 2021, from the USPTO in U.S. Appl. No. 16/112,972.
Communication dated Apr. 7, 2020, issued by the U.S. Patent and Trademark Office in U.S. Appl. No. 16/112,972.
Communication dated Jul. 14, 2020, issued by the U.S. Patent and Trademark Office in U.S. Appl. No. 16/112,972.
Communication dated Oct. 14, 2020, issued by the U.S. Patent and Trademark Office in U.S. Appl. No. 16/112,972.
U.S. Appl. No. 16/112,972, filed Aug. 27, 2018.
Corrected Notice of Allowance dated May 14, 2021 from the US Patent & Trademark Office in U.S. Appl. No. 16/112,972.

* cited by examiner

NONAQUEOUS ELECTROLYTE SECONDARY BATTERY

BACKGROUND OF THE INVENTION

1. Field of the Invention

The present teaching relates to a nonaqueous electrolyte secondary battery. The present application claims priority based on Japanese Patent Application No. 2017-174334 filed on Sep. 11, 2017, the entire contents of which are incorporated herein by reference.

2. Description of the Related Art

In recent years, nonaqueous electrolyte secondary batteries such as lithium ion secondary batteries have been advantageously used as portable power sources for personal computers, mobile terminals and the like, and as driving power sources for vehicles such as electric vehicles (EV), hybrid vehicles (HV), and plug-in hybrid vehicles (PHV).

With the widespread use of nonaqueous electrolyte secondary batteries, further improvement in performance is desired. A technique of using a positive electrode active material with tungsten present on the surface thereof in combination with a nonaqueous electrolyte including lithium fluorosulfonate as an additive in order to improve the performance of a nonaqueous electrolyte secondary battery is known (see, for example, Japanese Patent Application Publication No. 2015-037012). In Japanese Patent Application Publication No. 2015-037012, a microporous membrane made of a polyolefin-based material is used as a separator.

SUMMARY OF THE INVENTION

However, as a result of intensive research conducted by the inventor of the present teaching, it was found that the technique disclosed in Japanese Patent Application Publication No. 2015-037012 has a problem in low-temperature performance. Specifically, it was found that the technique disclosed in Japanese Patent Application Publication No. 2015-037012 has a problem that the discharge capacity is not sufficient when large current flows at low temperature.

In view of the above, it is an object of the present teaching to provide a nonaqueous electrolyte secondary battery in which a positive electrode active material includes tungsten and lithium fluorosulfonate is added to a nonaqueous electrolytic solution and which demonstrates excellent low-temperature performance.

The nonaqueous electrolyte secondary battery disclosed herein includes a positive electrode, a negative electrode, a separator interposed between the positive electrode and the negative electrode, and a nonaqueous electrolytic solution. The positive electrode includes a positive electrode active material layer. The positive electrode active material layer includes, as a positive electrode active material, a lithium transition metal composite oxide including at least lithium, nickel, manganese, cobalt, and tungsten. The nonaqueous electrolytic solution includes lithium fluorosulfonate and $LiPF_6$. A concentration of $LiPF_6$ in the nonaqueous electrolytic solution is 1.11 mol/L or more. A viscosity of the nonaqueous electrolytic solution at 25° C. is 3.1 cP or more. The separator includes a resin layer and an inorganic layer formed on a surface of the resin layer that faces the positive electrode. Where a porosity of the inorganic layer is denoted by $\alpha$, a porosity of the resin layer is denoted by $\beta$, and a porosity of the positive electrode active material layer is denoted by $\gamma$, relationships of $0.6 \leq (\beta/\alpha) \leq 0.9$ and $0.6 \leq (\gamma/\alpha) \leq 0.9$ are fulfilled.

When the concentration of $LiPF_6$ in the nonaqueous electrolytic solution is less than 1.11 mol/L or the viscosity of the nonaqueous electrolytic solution at 25° C. is less than 3.1 cP, a local concentration difference occurs at the time of decomposition of the nonaqueous electrolytic solution, and a coating film is formed nonuniformly on the electrode surface. As a result, the low-temperature performance deteriorates. When the ratio $\beta/\alpha$ exceeds 0.9, it is impossible to ensure the nonaqueous electrolytic solution amount and the fluidity (degree of liquid retention) of the nonaqueous electrolytic solution on the positive electrode surface where the reaction easily proceeds, and a coating film is formed nonuniformly on the positive electrode surface. As a result, the low-temperature performance deteriorates. When the ratio $\beta/\alpha$ is less than 0.6, the concentration of the supporting salt is biased in the resin layer during charging and discharging of the nonaqueous electrolyte secondary battery, and resistance increases. As a result, the low-temperature performance deteriorates. When the ratio $\gamma/\alpha$ exceeds 0.9, it is impossible to ensure the nonaqueous electrolytic solution amount and the fluidity (degree of liquid retention) of the nonaqueous electrolytic solution on the positive electrode surface where the reaction easily proceeds, and a coating film is formed nonuniformly on the positive electrode surface. As a result, the low-temperature performance deteriorates. When the ratio $\gamma/\alpha$ is less than 0.6, the fluidity (degree of liquid retention) of the electrolytic solution in the positive electrode decreases and a coating is formed nonuniformly on the surface of the positive electrode active material. As a result, the low-temperature performance deteriorates.

Therefore, by adequately controlling the concentration of the supporting salt in the nonaqueous electrolytic solution, the viscosity of the nonaqueous electrolytic solution, the porosity of the inorganic layer of the separator, the porosity of the resin layer of the separator, and the porosity of the positive electrode active material layer, it is possible to form a uniform coating film having good ion conductivity (in particular, the conductivity of ions serving as charge carriers) and derived from lithium fluorosulfonate, on the positive electrode surface. Because of such features, it is possible to provide a nonaqueous electrolyte secondary battery in which a positive electrode active material includes tungsten and lithium fluorosulfonate is added to a nonaqueous electrolytic solution and which demonstrates excellent low-temperature performance.

In a desired aspect of the nonaqueous electrolyte secondary battery disclosed herein, a content of nickel with respect to a total content of nickel, manganese, and cobalt in the lithium transition metal composite oxide is 34 mol % or more.

Because of such a feature, the electric resistance of the nonaqueous electrolyte secondary battery decreases and the capacity increases.

In a desired aspect of the nonaqueous electrolyte secondary battery disclosed herein, the viscosity of the nonaqueous electrolytic solution at 25° C. is 4.0 cP or less.

Because of such a feature, the diffusibility of the ions serving as the charge carriers in the charging and discharging process increases and the resistance of the nonaqueous electrolyte secondary battery can be lowered.

In a desired aspect of the nonaqueous electrolyte secondary battery disclosed herein, a relationship of $(\gamma/\beta) \geq 1.0$ is further fulfilled.

Because of such a feature, the concentration of the supporting salt contained in the nonaqueous electrolytic solution hardly becomes nonuniform in the separator in the charging and discharging process, and the resistance of the nonaqueous electrolyte secondary battery can be lowered.

In a desired aspect of the nonaqueous electrolyte secondary battery disclosed herein, the inorganic layer of the separator includes aluminum oxide.

Because of such a feature, since aluminum oxide is electrochemically inactive, the main constituents of the inorganic layer are prevented from decomposing and then forming an insulating film at the time of decomposition of the nonaqueous electrolytic solution or at the time of formation of the coating film. As a result, a better coating film can be formed, and the battery performance can be further improved.

In a desired aspect of the nonaqueous electrolyte secondary battery disclosed herein, the resin layer of the separator includes polypropylene and polyethylene. Because of such a feature, it is easy to control the porosity of the resin layer by the composition and manufacturing conditions, which is advantageous in terms of production of a nonaqueous electrolyte secondary battery.

DESCRIPTION OF THE PREFERRED EMBODIMENT

An embodiment of the present teaching will be described below with reference to the drawings. Incidentally, the matters other than those specifically mentioned in the present specification and necessary for the implementation of the present teaching (for example, the general configuration and production process of a nonaqueous electrolyte secondary battery not characterizing the present teaching) can be understood as design matters to be addressed by a person skilled in the art on the basis of the related art in the pertinent field. The present teaching can be carried out based on the contents disclosed in this specification and technical common sense in the field. In addition, in the following drawings, the same reference numerals are attached to members and parts that exhibit the same action. Further, the dimensional relationship (length, width, thickness, and the like) in each drawing does not reflect the actual dimensional relationship.

In this specification, the term "secondary battery" generally refers to a power storage device that can be repeatedly charged and discharged, and this term is inclusive of power storage elements such as a so-called power storage battery and an electric double layer capacitor.

Further, the term "nonaqueous electrolyte secondary battery" refers to a battery including a nonaqueous electrolytic solution (typically, a nonaqueous electrolytic solution including a supporting electrolyte in a nonaqueous solvent).

Hereinafter, the present teaching will be described in detail by taking a flat angular lithium ion secondary battery having a flat-shaped wound electrode body and a flat-shaped battery case as an example, but the present teaching is not intended to be limited to the configuration described in the embodiment.

Figure 1:
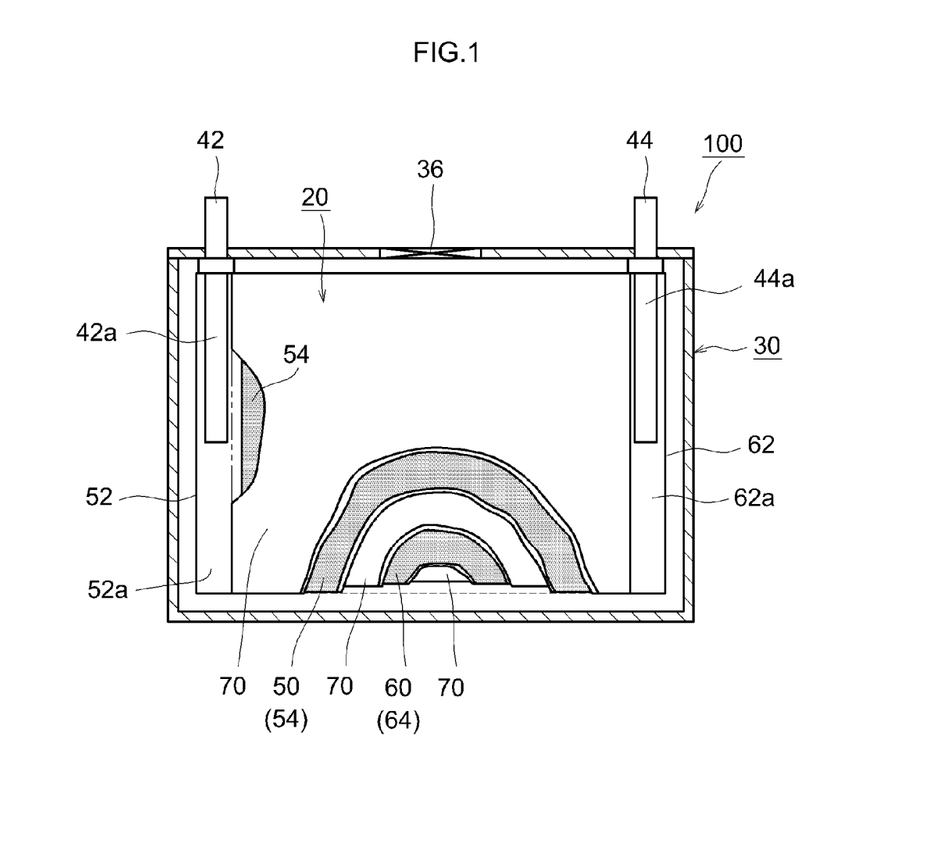
FIG. 1 is a cross-sectional view schematically showing the internal structure of a lithium ion secondary battery according to one embodiment of the present teaching.

A lithium ion secondary battery 100 shown in FIG. 1 is a sealed battery constructed by accommodating a flat-shaped wound electrode body 20 and a nonaqueous electrolytic solution (not shown) in a flat angular battery case (that is, an outer case) 30. The battery case 30 is provided with a positive electrode terminal 42 and a negative electrode terminal 44 for external connection and a thin safety valve 36 which is set so as to release an internal pressure when the internal pressure of the battery case 30 rises to a predetermined level or higher. In addition, an injection port (not shown) for injecting the nonaqueous electrolytic solution is provided in the battery case 30. The positive electrode terminal 42 is electrically connected to the positive electrode current collector plate 42a. The negative electrode terminal 44 is electrically connected to the negative electrode current collector plate 44a. As a material of the battery case 30, for example, a lightweight metal material having good thermal conductivity such as aluminum is used.

Figure 2:
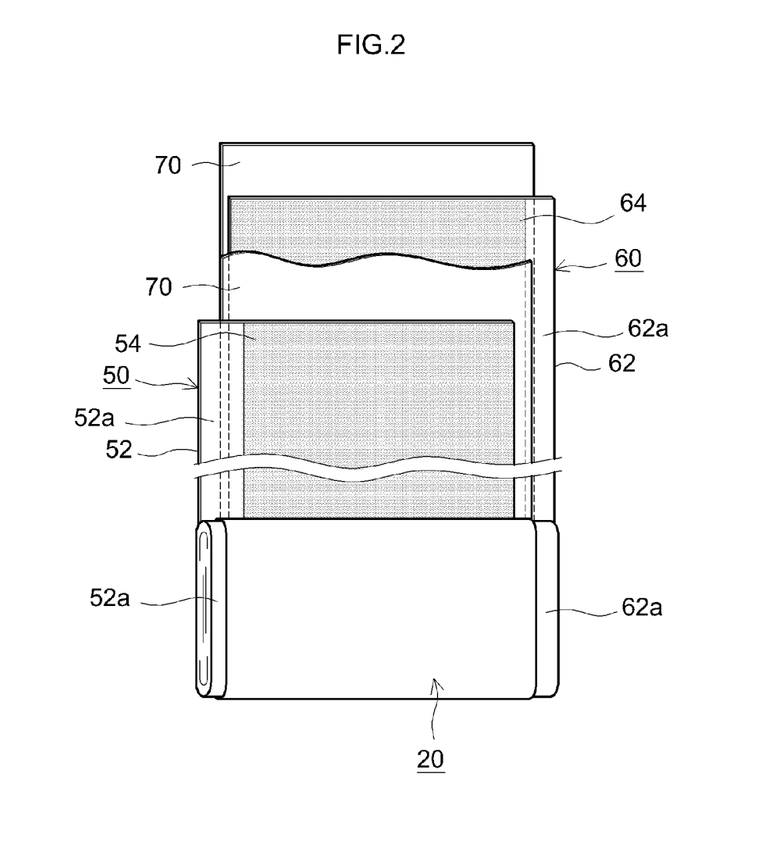
FIG. 2 is a schematic view showing the configuration of a wound electrode body of a lithium ion secondary battery according to one embodiment of the present teaching.

As shown in FIGS. 1 and 2, the wound electrode body 20 has a structure obtained by laminating a positive electrode sheet 50 in which a positive electrode active material layer 54 is formed along the longitudinal direction on one side or both sides (here, both sides) of an elongated positive electrode current collector 52 and a negative electrode sheet 60 in which a negative electrode active material layer 64 is formed along the longitudinal direction on one side or both sides (here, both sides) of an elongated negative electrode current collector 62, with two elongated separator sheets 70 being interposed therebetween, and winding the laminate in the longitudinal direction. A positive electrode active material layer non-formation portion 52a (that is, a portion where the positive electrode active material layer 54 is not formed and the positive electrode current collector 52 is exposed) and a negative electrode active material layer non-formation portion 62a (that is, a portion where the negative electrode active material layer 64 is not formed and the negative electrode current collector 62 is exposed), which are formed to protrude from the outside from both ends of the wound electrode body 20 in the winding axis direction (that is, a sheet width direction orthogonal to the longitudinal direction) are joined to a positive electrode current collector plate 42a and a negative electrode current collector plate 44a, respectively.

The positive electrode current collector 52 constituting the positive electrode sheet 50 is exemplified by an aluminum foil or the like.

The positive electrode active material layer 54 includes, as a positive electrode active material, a lithium transition metal composite oxide including at least lithium, nickel, manganese, cobalt, and tungsten. That is, in the present embodiment, a lithium-nickel-manganese-cobalt-based composite oxide that further includes tungsten is typically used as the positive electrode active material. The lithium-nickel-manganese-cobalt-based composite oxide desirably has a layered rock salt type structure.

The content of nickel with respect to the total content of nickel, manganese, and cobalt in the lithium transition metal composite oxide is not particularly limited but is desirably 34 mol % or more. In this case, the electric resistance of the lithium ion secondary battery 100 decreases and the capacity increases. From the viewpoint of not lowering the performance of the lithium-nickel-manganese-cobalt-based composite oxide as the positive electrode active material, the content of nickel with respect to the total content of nickel, manganese, and cobalt is desirably 60 mol % or less.

The lithium transition metal composite oxide may further include a metal element other than lithium, nickel, manganese, cobalt, and tungsten (for example, Zr, Mo, Mg, Ca, Na, Fe, Cr, Zn, Si, Sn, Al, and the like).

A lithium-nickel-manganese-cobalt-based composite oxide represented by a following Formula (I) can be advantageously used as the positive electrode active material.

$$Li_aNi_xMn_yCo_zW_bO_2 \quad (I)$$

Here, a satisfies 0.98≤a≤1.20; x, y, z, and b satisfy x+y+z+b=1±0.05, and more desirably x+y+z+b=1±0.02; x desirably satisfies 0.20≤c≤0.60, and more desirably 0.34≤x≤0.60; y desirably satisfies 0<y≤0.50, and more desirably 0<y≤0.40; z desirably satisfies 0<z≤0.50, and more desirably 0<z≤0.40; and b desirably satisfies 0.0005≤b≤0.05, and more desirably 0.005≤b≤0.02.

The positive electrode active material layer 54 may further include a positive electrode active material other than the above-mentioned lithium transition metal composite oxide within a range in which the effect of the present teaching is not impaired.

The content of the positive electrode active material is desirably 70% by mass or more, and more desirably 75% by mass or more in the positive electrode active material layer 54 (that is, with respect to the total mass of the positive electrode active material layer 54).

The positive electrode active material layer 54 may include components other than the positive electrode active material. Examples thereof include a conductive material, a binder, and the like.

For example, carbon black such as acetylene black (AB) or other carbon materials (for example, graphite or the like) can be advantageously used as the conductive material. The content of the conductive material in the positive electrode active material layer 54 is desirably 1% by mass or more and 15% by mass or less, and more desirably 3% by mass or more and 12% by mass or less.

For example, polyvinylidene fluoride (PVdF) or the like can be used as the binder. The content of the binder in the positive electrode active material layer 54 is desirably 1% by mass or more and 15% by mass or less, and more desirably 2% by mass or more and 12% by mass or less.

The negative electrode current collector 62 constituting the negative electrode sheet 60 can be exemplified by a copper foil or the like. For example, a carbon material such as graphite, hard carbon, soft carbon or the like can be used as the negative electrode active material to be included in the negative electrode active material layer 64. The graphite may be natural graphite or artificial graphite and may be amorphous carbon-coated graphite in which graphite is coated with an amorphous carbon material. The negative electrode active material layer 64 may include components other than the active material, such as a binder and a thickener. For example, styrene butadiene rubber (SBR) or the like can be used as the binder. For example, carboxymethyl cellulose (CMC) or the like can be used as the thickener.

The content of the negative electrode active material in the negative electrode active material layer is desirably 90% by mass or more, and more desirably 95% by mass or more and 99% by mass or less. The content of the binder in the negative electrode active material layer is desirably 0.1% by mass or more and 8% by mass or less, and more desirably 0.5% by mass or more and 3% by mass or less. The content of the thickener in the negative electrode active material layer is desirably 0.3% by mass or more and 3% by mass or less, and more desirably 0.5% by mass or more and 2% by mass or less.

Figure 3:
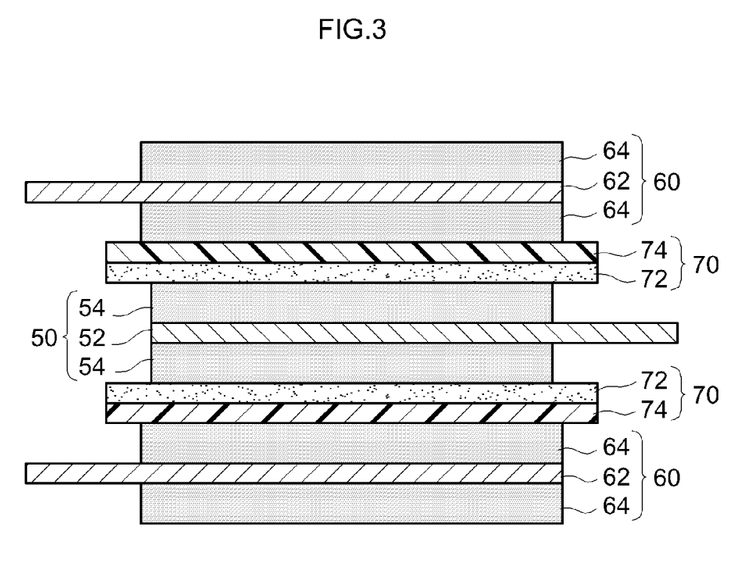
FIG. 3 is a schematic cross-sectional view showing a part of the laminated structure of a wound electrode body of a lithium ion secondary battery according to one embodiment of the present teaching.

As shown in FIG. 3, the separator 70 includes a resin layer 74 and an inorganic layer 72 formed on the surface of the resin layer 74 that faces the positive electrode 50. The separator 70 may further have a heat-resistant layer on the surface of the resin layer 74 that faces the negative electrode 60.

The resin layer 74 is usually microporous and is formed of a resin such as polyethylene (PE), polypropylene (PP), a polyester, cellulose, a polyamide, or the like. The resin layer 74 desirably includes two kinds of resins, namely, polyethylene and polypropylene. In this case, it is easy to control the porosity of the resin layer 74 by the composition and manufacturing conditions, which is advantageous in terms of the production of the lithium ion secondary battery 100 according to the present embodiment.

The inorganic layer 72 is usually a microporous layer formed from an inorganic filler. Accordingly, the inorganic layer 72 includes particles of an inorganic filler, and may optionally include a binder, a thickener, and the like.

As the inorganic filler, an inorganic substance excellent in heat resistance can be advantageously used. Examples of the inorganic filler include inorganic oxides such as aluminum oxide, magnesium oxide, silicon oxide, titanium oxide, nitrides such as aluminum nitride and silicon nitride, metal hydroxides such as calcium hydroxide, magnesium hydroxide, and aluminum hydroxide, clay minerals such as mica, talc, boehmite, zeolite, apatite, and kaolin, glass fiber and the like. Among them, aluminum oxide is desirable. Since aluminum oxide is electrochemically inactive, the main constituents of the inorganic layer are prevented from decomposing and then forming an insulating film at the time of decomposition of the nonaqueous electrolytic solution or at the time of formation of the coating film. As a result, a better coating film can be formed, and the battery performance can be further improved.

As the binder, for example, an acrylic binder, styrene butadiene rubber (SBR), a polyolefin binder, fluoropolymer binder, and the like can be used.

As the thickener, for example, carboxymethyl cellulose (CMC), methyl cellulose (MC) or the like can be used.

The nonaqueous electrolytic solution includes lithium fluorosulfonate and LiPF$_6$.

The nonaqueous electrolytic solution typically further includes a nonaqueous solvent.

As the nonaqueous solvent, an organic solvent such as various carbonates, ethers, esters, nitriles, sulfones, lactones and the like usable for an electrolytic solution of a general lithium ion secondary battery can be used without particular limitation. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), trifluorodimethyl carbonate (TFDMC), and the like. Such nonaqueous solvents may be used singly or in appropriate combination of two or more thereof.

LiPF$_6$ is a component functioning as a supporting salt. The concentration of LiPF$_6$ in the nonaqueous electrolytic solution is 1.1 mol/L (1.11 M) or more. When the concentration of LiPF$_6$ in the nonaqueous electrolytic solution is less than 1.11 mol/L, a local concentration difference occurs at the time of decomposition of the nonaqueous electrolytic solution, and a coating film is formed nonuniformly on the electrode surface. As a result, the low-temperature performance deteriorates. The concentration of $LiPF_6$ in the nonaqueous electrolytic solution is desirably 1.3 mol/L or less.

Lithium fluorosulfonate is a component contributing to the formation of a coating film on the positive electrode surface. The content of lithium fluorosulfonate in the nonaqueous electrolytic solution is not particularly limited and is, for example, 0.15% by mass or more and 1.0% by mass or less, desirably 0.2% by mass or more and 0.8% by mass and less, and even more desirably 0.25% by mass or more and 0.75% by mass or less.

As long as the effect of the present teaching is not remarkably impaired, the nonaqueous electrolytic solution may include components other than the above-mentioned components, for example, various additives such as a gas generating agent such as biphenyl (BP), cyclohexylbenzene (CHB), a thickener, and the like.

In the present embodiment, the viscosity of the nonaqueous electrolytic solution at 25° C. is 3.1 cP or more. Where the viscosity of the nonaqueous electrolytic solution at 25° C. is less than 3.1 cP, a local concentration difference occurs at the time of decomposition of the nonaqueous electrolytic solution, and a coating film is formed nonuniformly on the electrode surface. As a result, the low-temperature performance deteriorates. The viscosity of the nonaqueous electrolytic solution at 25° C. is desirably 4.0 cP or less. In this case, the diffusibility of ions serving as the charge carriers (for example. Li ions or the like) in the charging and discharging process increases and the resistance of the lithium ion secondary battery 100 can be lowered.

The viscosity of the nonaqueous electrolytic solution at 25° C. can be measured using a well-known viscometer (for example, TV-20 Viscometer manufactured by Toki Sangyo Co., Ltd.).

The viscosity of the nonaqueous electrolytic solution at 25° C. can be adjusted by changing the type or concentration of components contained in the nonaqueous electrolytic solution.

In the present embodiment, where a porosity of the inorganic layer 72 of the separator 70 is denoted by $\alpha$, a porosity of the resin layer 74 of the separator 70 is denoted by $\beta$, and a porosity of the positive electrode active material layer 54 is denoted by $\gamma$, relationships of $0.6 \leq (\beta/\alpha) \leq 0.9$ and $0.6 \leq (\gamma/\alpha) \leq 0.9$ are fulfilled. When the ratio $\beta/\alpha$ exceeds 0.9, it is impossible to ensure the nonaqueous electrolytic solution amount and the fluidity (degree of liquid retention) of the nonaqueous electrolytic solution on the positive electrode surface where the reaction easily proceeds, and a coating film is formed nonuniformly on the positive electrode surface. As a result, the low-temperature performance deteriorates. When the ratio $\beta/\alpha$ is less than 0.6, the concentration of the supporting salt is biased in the resin layer 74 during charging and discharging of the lithium ion secondary battery 100, and resistance increases. As a result, the low-temperature performance deteriorates. When the ratio $\gamma/\alpha$ exceeds 0.9, it is impossible to ensure the nonaqueous electrolytic solution amount and the fluidity (degree of liquid retention) of the nonaqueous electrolytic solution on the positive electrode surface where the reaction easily proceeds, and a coating film is formed nonuniformly on the positive electrode surface. As a result, the low-temperature performance deteriorates. When the ratio $\gamma/\alpha$ is less than 0.6, the fluidity (degree of liquid retention) of the electrolytic solution in the positive electrode decreases and a coating film is formed nonuniformly on the surface of the positive electrode active material. As a result, the low-temperature performance deteriorates.

In the present embodiment, a relationship of $(\gamma/\beta) \geq 1.0$ is desirably further fulfilled. In this case, the concentration of the supporting salt contained in the nonaqueous electrolytic solution hardly becomes nonuniform in the separator in the charging and discharging process, and the resistance of the lithium ion secondary battery 100 can be lowered.

Further, the porosity $\alpha$ of the inorganic layer of the separator 70, the porosity $\beta$ of the resin layer of the separator 70, and the porosity $\gamma$ of the positive electrode active material layer 54 can be calculated by Formula: 1−(apparent density/true density). Specifically, the true density is calculated based on the density and content ratio of constituent components for each of the inorganic layer 72 of the separator 70, the resin layer 74 of the separator 70, and the positive electrode active material layer 54, whereas the weight and volume are measured to calculate the apparent density. The porosity can then be calculated by substituting the calculated true density and apparent density into Formula: 1−(apparent density/true density).

The porosity $\alpha$ of the inorganic layer 72 of the separator 70 can be adjusted by changing the type or particle diameter of the material constituting the inorganic layer 72 or manufacturing conditions. For example, the porosity $\alpha$ of the inorganic layer 72 can be adjusted by forming the inorganic layer 72 and then pressing the layer.

The porosity $\beta$ of the resin layer 74 of the separator 70 can be adjusted by changing the type of resin constituting the resin layer 74 or manufacturing conditions.

The porosity $\gamma$ of the positive electrode active material layer 54 can be adjusted by changing the type or particle diameter of the material constituting the positive electrode active material layer 54 and manufacturing conditions (in particular, the conditions of press treatment).

In a lithium ion secondary battery in which lithium fluorosulfonate is added to a nonaqueous electrolytic solution, lithium fluorosulfonate decomposes slightly during repeated charging and discharging, and a coating film derived from lithium fluorosulfonate is formed on the surface of the positive electrode active material. In the related art, this coating film has low diffusibility of ions (for example, lithium ions) serving as charge carriers and increases battery resistance. As a result, low-temperature performance (in particular, discharge capacity when large current flows at low temperature) is poor. It is conceivable that this is because the coating film is formed with a structure insufficient for conducting ions satisfactorily due to a distribution in organic components and inorganic components, nonuniform composition, and the like.

It is conceivable that the reason why the coating film is formed with a structure insufficient for conducting ions satisfactorily is that the decomposition reaction of the nonaqueous electrolytic solution easily proceeds on the surface of the positive electrode active material layer and where the state of presence of the electrolytic solution is nonuniform in the vicinity of the surface of the positive electrode active material layer, the formation of the coating film becomes nonuniform.

Accordingly, in the present embodiment, the fluidity of the nonaqueous electrolyte solution in the separator 70 and the positive electrode active material layer 54 is controlled, so as to prevent the state of presence of the nonaqueous electrolytic solution from becoming nonuniform, by adequately adjusting the concentration of the supporting salt in the nonaqueous electrolytic solution, the viscosity of the nonaqueous electrolytic solution, the porosity of the inorganic layer 72 of the separator 70, the porosity of the resin layer 74 of the separator 70, and the porosity of the positive electrode active material layer 54. Specifically, the porosity of the inorganic layer 72 formed on the surface of the separator 70 which faces the positive electrode 50 (positive electrode active material layer 54) is made highest and the viscosity of the nonaqueous electrolytic solution is adjusted so that the nonaqueous electrolytic solution moves to the vicinity of the surface of the positive electrode active material layer 54, and the nonaqueous electrolytic solution is easily retained in this portion. Thus, the inorganic layer 72 of the separator 70 functions as a liquid retaining layer. As a result, the state of presence of the nonaqueous electrolytic solution in the vicinity of the surface of the positive electrode active material layer becomes uniform, so that a coating film having satisfactory ion conductivity (in particular, conductivity of ions serving as charge carriers), this coating film being derived from lithium fluorosulfonate (supposedly, a coating film in which an organic substance and an inorganic substance in which Li, W, F, and O are combined are adequately arranged), can be uniformly formed on the surface of the positive electrode active material. In addition, the concentration of $LiPF_6$, which is the supporting salt, is specified and the porosity of the inorganic layer 72 is prevented from becoming excessively high, thereby suppressing the occurrence of unevenness in concentration of the supporting salt, such unevenness lowering the low-temperature performance. Therefore, because of such features, the lithium ion secondary battery 100 having excellent low-temperature performance (particularly, discharge capacity when large current flows at low temperature) is provided.

The lithium ion secondary battery 100 configured as described above can be used for various purposes. Suitable applications include a driving power supply installed on a vehicle such as an electric vehicle (EV), a hybrid vehicle (HV), a plug-in hybrid vehicle (PHV), or the like. Typically, the lithium ion secondary battery 100 can also be used in the form of a battery pack in which a plurality of lithium ion secondary batteries 100 is connected in series and/or in parallel.

The rectangular lithium ion secondary battery 100 including the flat-shaped wound electrode body 20 has been described hereinabove by way of example. However, the nonaqueous electrolyte secondary battery disclosed herein can also be configured as a lithium ion secondary battery including a stacked electrode body. Further, the nonaqueous electrolyte secondary battery disclosed herein can also be configured as a cylindrical lithium ion secondary battery. The nonaqueous electrolyte secondary battery disclosed herein can also be configured as a nonaqueous electrolyte secondary battery other than the lithium ion secondary battery.

Hereinafter, examples relating to the present teaching will be described, but the present teaching is not intended to be limited to the configurations shown in the examples.

Preparation of Evaluation Lithium Ion Secondary Battery A1

$LiNi_{0.34}Co_{0.33}Mn_{0.32}W_{0.01}O_2$ having an average secondary particle diameter of 4 μm as a positive electrode active material, acetylene black (AB) as a conductive material, and polyvinylidene fluoride (PVdF) as a binder were mixed with N-methyl-2-pyrrolidone (NMP) at a mass ratio of positive electrode active material:AB:PVdF=100:13:13 to prepare a paste for forming a positive electrode active material layer. This paste was coated on an aluminum foil and dried to form a positive electrode active material layer. Subsequently, press treatment was performed to prepare a positive electrode sheet with the porosity of the positive electrode active material layer being controlled.

Further, natural graphite (C) as a negative electrode active material, styrene butadiene rubber (SBR) as a binder, and carboxymethyl cellulose (CMC) as a thickener were mixed with ion exchanged water at a ratio of C:SBR:CMC=98:1:1 to prepare a paste for forming a negative electrode active material layer. This paste was coated on a copper foil, dried, and pressed to prepare a negative electrode sheet.

A separator having an inorganic layer including aluminum oxide on the surface of a porous resin sheet (resin layer) containing polyethylene and polypropylene as resin components was then prepared. The separator was selected such as to have $\beta/\alpha=0.6$, $\gamma/\alpha=0.6$, $\gamma/\beta=1.0$ where $\alpha$ stands for the porosity of the inorganic layer of the separator, $\beta$ stands for the porosity of the resin layer of the separator, and $\gamma$ stands for the porosity of the positive electrode active material layer.

The positive electrode sheet, the negative electrode sheet, and the separator were laminated so that the inorganic layer of the separator faced the positive electrode sheet, thereby preparing an electrode body.

A mixed solvent including ethylene carbonate (EC), ethyl methyl carbonate (EMC) and dimethyl carbonate (DMC) at a volume ratio of 1:1:1 was prepared, lithium fluorosulfonate was added thereto, and $LiPF_6$ as a supporting salt was then dissolved to a concentration of 1.11 mol/L to prepare a nonaqueous electrolytic solution. The viscosity of the obtained nonaqueous electrolytic solution at 25° C. was measured using a viscometer. The result was 3.1 cP.

An evaluation lithium ion secondary battery A1 was prepared using the electrode body and the nonaqueous electrolytic solution.

Preparation of Evaluation Lithium Ion Secondary Batteries A2 to A4 and B1 to B8

Evaluation lithium ion secondary batteries A2 to A4 and B1 to B8 were prepared in the same manner as the evaluation lithium ion secondary battery A1, except that the concentration of $LiPF_6$ in the nonaqueous electrolytic solution, the viscosity of the nonaqueous electrolytic solution at 25° C., the $\beta/\alpha$ ratio, the $\gamma/\alpha$ ratio, and the $\gamma/\beta$ ratio were changed to the values shown in Table 1 by changing the concentration of components contained in the nonaqueous electrolytic solution, changing the pressing conditions at the time of forming the positive electrode active material layer, changing the porosity of the resin layer of the separator, and changing the porosity of the inorganic layer.

Evaluation of Low-Temperature Performance

For each of the evaluation lithium ion secondary batteries prepared as described hereinabove, the discharge capacity obtained when a large current was passed under a low-temperature environment of −10° C. was determined. Then, for each evaluation lithium ion secondary battery, the ratio of the discharge capacity was calculated when the discharge capacity of the evaluation lithium ion secondary battery B2 was set to 100. The results are shown in Table 1.

TABLE 1

| Battery No. | Nonaqueous electrolytic solution | | | | | Low-temperature performance (capacity ratio) |
|---|---|---|---|---|---|---|
| | LiPF$_6$ concentration (mol/L) | Viscosity (cP) | β/α | γ/α | γ/β | |
| A1 | 1.11 | 3.1 | 0.6 | 0.6 | 1.0 | 125 |
| A2 | 1.11 | 3.2 | 0.6 | 0.9 | 1.5 | 116 |
| A3 | 1.11 | 3.1 | 0.9 | 0.6 | 0.7 | 144 |
| A4 | 1.11 | 3.1 | 0.9 | 0.9 | 1.0 | 131 |
| B1 | 1.09 | 2.9 | 0.6 | 0.6 | 1.0 | 99 |
| B2 | 1.09 | 2.9 | 0.6 | 0.9 | 1.5 | 100 |
| B3 | 1.09 | 2.9 | 0.9 | 0.6 | 0.7 | 94 |
| B4 | 1.09 | 2.9 | 0.9 | 0.9 | 1.0 | 96 |
| B5 | 1.09 | 2.9 | 0.5 | 0.5 | 1.0 | 90 |
| B6 | 1.09 | 2.9 | 0.5 | 1.0 | 2.0 | 91 |
| B7 | 1.09 | 2.9 | 1.0 | 0.5 | 0.5 | 86 |
| B8 | 1.09 | 2.9 | 1.0 | 1.0 | 1.0 | 87 |

From the results shown in Table 1, it is understood that when the nonaqueous electrolytic solution includes lithium fluorosulfonate and LiPF$_6$, the concentration of LiPF$_6$ in the nonaqueous electrolytic solution is 1.11 mol/L or more, the viscosity of the nonaqueous electrolytic solution at 25° C. is 3.1 cP or more, the relationship of $0.6 \leq (\beta/\alpha) \leq 0.9$ is fulfilled, and the relationship of $0.6 \leq (\gamma/\alpha) \leq 0.9$ is fulfilled, the discharge capacity is large when large current flows at low temperature.

Therefore, it is understood that the nonaqueous electrolyte secondary battery disclosed herein has excellent low-temperature performance.

Although specific examples of the present teaching have been described in detail above, these are merely illustrative and do not limit the scope of the claims. Techniques described in the claims include those in which the concrete examples exemplified hereinabove are variously modified and changed.

What is claimed is:

1. A nonaqueous electrolyte secondary battery comprising:
   a positive electrode;
   a negative electrode;
   a separator interposed between the positive electrode and the negative electrode; and
   a nonaqueous electrolytic solution, wherein
   the positive electrode includes a positive electrode active material layer,
   the positive electrode active material layer includes, as a positive electrode active material, a lithium transition metal composite oxide including at least lithium, nickel, manganese, cobalt, and tungsten,
   the nonaqueous electrolytic solution includes lithium fluorosulfonate and LiPF$_6$,
   a concentration of LiPF$_6$ in the nonaqueous electrolytic solution is 1.11 mol/L or more,
   a viscosity of the nonaqueous electrolytic solution at 25° C. is 3.1 cP to 4.0 cp,
   the separator includes a resin layer and an inorganic layer formed on a surface of the resin layer that faces the positive electrode, and
   where a porosity of the inorganic layer is denoted by α, a porosity of the resin layer is denoted by β, and a porosity of the positive electrode active material layer is denoted by γ, relationships of $0.6 \leq (\beta/\alpha) \leq 0.9$ and $0.6 \leq (\gamma/\alpha) \leq 0.9$ are fulfilled;
   a relationship of $(\gamma/\beta) \geq 1.0$ is further fulfilled;
   a content of nickel with respect to a total content of nickel, manganese, and cobalt in the lithium transition metal composite oxide is 34 mol % or more; and
   the inorganic layer of the separator includes aluminum oxide.

2. The nonaqueous electrolyte secondary battery according to claim 1, wherein the resin layer of the separator includes polypropylene and polyethylene.

* * * * *